(12) United States Patent
Munoz Lopez et al.

(10) Patent No.: US 7,806,367 B2
(45) Date of Patent: Oct. 5, 2010

(54) INTEGRATED MULTISPAR TORSION BOX OF COMPOSITE MATERIAL

(75) Inventors: Maria Pilar Munoz Lopez, Madrid (ES); Francisco Jose Cruz Dominguez, Madrid (ES); Jose David Cano Cediel, Madrid (ES)

(73) Assignee: Airbus Espana, S.L., Madrid (ES)

( * ) Notice: Subject to any disclaimer, the term of this patent is extended or adjusted under 35 U.S.C. 154(b) by 362 days.

(21) Appl. No.: 11/825,123

(22) Filed: Jul. 2, 2007

(65) Prior Publication Data

US 2008/0265093 A1  Oct. 30, 2008

(30) Foreign Application Priority Data

Apr. 30, 2007  (WO) ............... PCT/ES2007/070086

(51) Int. Cl.
 *B64C 3/18*  (2006.01)
(52) U.S. Cl. .................................. 244/123.7
(58) Field of Classification Search ............. 244/123.7, 244/123.1, 123.14, 123.3, 123.4, 123.5, 124, 244/117 R, 119; 156/554, 560
See application file for complete search history.

(56) References Cited

U.S. PATENT DOCUMENTS

| | | | | |
|---|---|---|---|---|
| 4,749,155 A | * | 6/1988 | Hammer et al. | 244/123.7 |
| 6,475,320 B1 | * | 11/2002 | Masugi | 156/189 |
| 6,502,788 B2 | * | 1/2003 | Noda et al. | 244/123.3 |
| 6,513,757 B1 | * | 2/2003 | Amaoka et al. | 244/123.7 |
| 6,689,246 B2 | * | 2/2004 | Hirahara et al. | 156/292 |
| 2003/0192990 A1 | * | 10/2003 | Simpson et al. | 244/123 |
| 2006/0249626 A1 | * | 11/2006 | Simpson et al. | 244/123.1 |

* cited by examiner

*Primary Examiner*—Tien Dinh
(74) *Attorney, Agent, or Firm*—Ladas & Parry LLP

(57) ABSTRACT

The invention relates to an integrated multispar torsion box structure of composite material for aircraft, comprising a lower skin (12), an upper skin (11), several spars (9), each of which comprises in turn a chord (13) and a web (14), several stringers (10) in the lower skin (12) and several stringers (10) in the upper skin (11), characterized in that the mentioned integrated torsion box structure is achieved by means of joining unitary U-shaped structural elements (15), unitary U-shaped structural elements (16) with a flap and unitary C-shaped structural elements (17) with a flap. The invention also relates to a method for manufacturing an integrated multispar torsion box structure of composite material for aircraft.

4 Claims, 6 Drawing Sheets

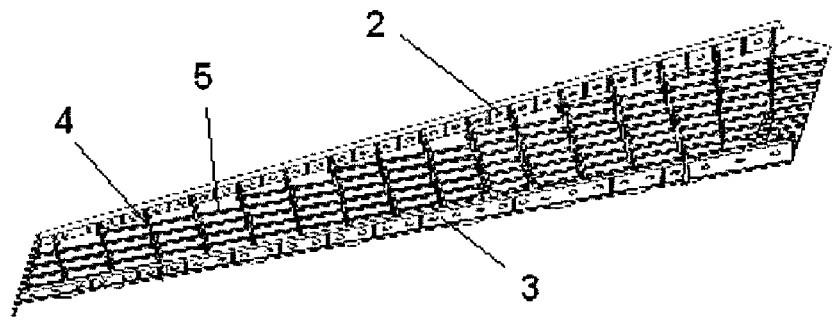
FIG 1
PRIOR ART
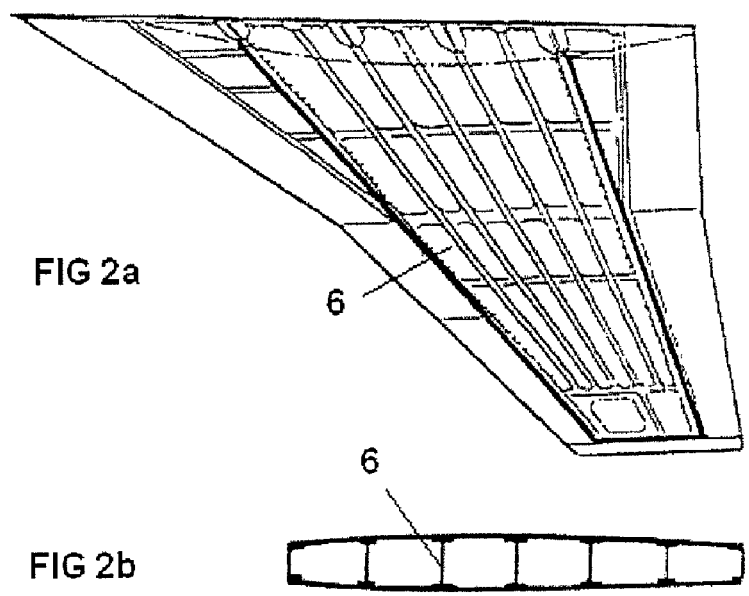
FIG 2a
FIG 2b

PRIOR ART

INTEGRATED MULTISPAR TORSION BOX OF COMPOSITE MATERIAL

FIELD OF THE INVENTION

The present invention relates to an integrated multispar torsion box structure of composite material as well as to a method for manufacturing such structure.

BACKGROUND OF THE INVENTION

It is commonly known that the aeronautical industry requires structures which on one hand can support the loads to which they are subjected, complying with high strength and rigidity requirements, and on the other hand are as light as possible. A result of this requirement is the increasingly extended use of composite materials in primary aircraft structures, involving an important weight saving compared to the use of metallic materials.

The main structure for supporting surfaces of airplanes is formed by a leading edge, a torsion box and a trailing edge. The torsion box of an aircraft is in turn formed by several structural elements. Typically, the process for manufacturing a torsion box is considerably manual and is carried out in a number of steps. The structural elements forming the box are manufactured separately and are mechanically joined with the aid of complicated jigs to achieve the necessary tolerances, which are given by the aerodynamic and structural requirements. This involves different assembly stations and a large amount of joining elements, which entails weight penalties, high production and assembly costs, greater necessary logistic capacity and worse aerodynamic quality in outer surfaces. If the parts are made of composite material, they are manufactured by stacking the different fiber layers and thus forming the desired element layer by layer. At this point, the composite material requires a rather expensive curing process to achieve all its properties.

For this reason, there have recently been great efforts to achieve an increasingly higher level of integration in the production of torsion boxes in composite material and thus prevent the aforementioned drawbacks. The problem consists mainly of generating sufficient pressure in all the elements during the joint curing process.

Thus, there are several known documents describing manufacturing methods which achieve the integration of typical structural elements with the aid of special curing jigs, assembling the remaining elements in the following assembly stages. This is the case of U.S. Pat. No. 5,216,799 (integration of ribs with spars), patent document EP 1074466A1 (integration of ribs) and U.S. Pat. No. 5,735,486 (integration of stringers-skins). Other levels of integration are achieved with the solutions set forth in U.S. Pat. No. 6,237,873B1, describing the manufacture of closed cross-sections and their subsequent joining, and U.S. Pat. No. 6,190,484B1, where contiguous boxes are adjoined to be jointly cured.

Patent documents EP 0582160A1, U.S. Pat. No. 6,896,841B2, U.S. Pat. No. 5,454,895, WO 2004/000643A2 and U.S. Pat. No. 5,817,269 are focused on the jig system for enabling the manufacture of the complete part in a single curing with good quality, whether with jigs which are inflated during the curing or use the difference of thermal expansion of different materials for exerting pressure during the curing at high temperatures.

However, all these solutions start from the basis of individually "pre-stacking" the basic structural elements and curing them jointly with the suitable jigs, which is not a real complete integration, while at the same time the manufacturing costs are high due to the high number of parts to be stacked, there further being a non-uniform passage of loads between the stacked elements.

The present invention is aimed at solving these drawbacks.

SUMMARY OF THE INVENTION

Therefore, the present invention relates to an integrated multispar torsion box structure of composite material for aircraft, comprising the following structural elements:
Lower skin
Upper skin
Several spars, which are in turn formed by:
Chord
Web
Several stringers in the upper skin
Several stringers in the lower skin The previous torsion box is created starting from individual elements in composite material which are already integrated from the stacking and which in turn assume several structural functions (they form part of the stringer, spar and/or skin at the same time), achieving a required complete integrated structure upon joining several of these elements before the final co-curing phase. This involves having all the advantages of an integrated structure, in addition to a greater manufacturing cost saving as there are less parts to be stacked and a more uniform passage of loads between the stacked elements.

The present invention further relates to a method for manufacturing an integrated multispar torsion box structure of composite material for aircraft, comprising the following steps:
1) stacking a compound with or without integrated stiffeners, carried out by any manual or automatic process;
2) bending the laminate or laminates by applying the suitable cycle and with the suitable jig;
3) joining the several elements which will form the desired structure;
4) consolidating the complete structure by means of applying a single pressure and temperature cycle.

Other features and advantages of the present invention will be understood from the following detailed description of an illustrative embodiment of its object in relation to the attached figures.

DESCRIPTION OF THE DRAWINGS

FIG. 1 shows a torsion box of an aircraft horizontal stabilizer with a typical multirib structure.

FIG. 2a shows the inside of a military airplane wing with a typical multispar structure.

FIG. 2b shows a cross-section of the inside of a military airplane wing with a typical multispar structure.

DETAILED DESCRIPTION OF THE INVENTION

Figure 2C:
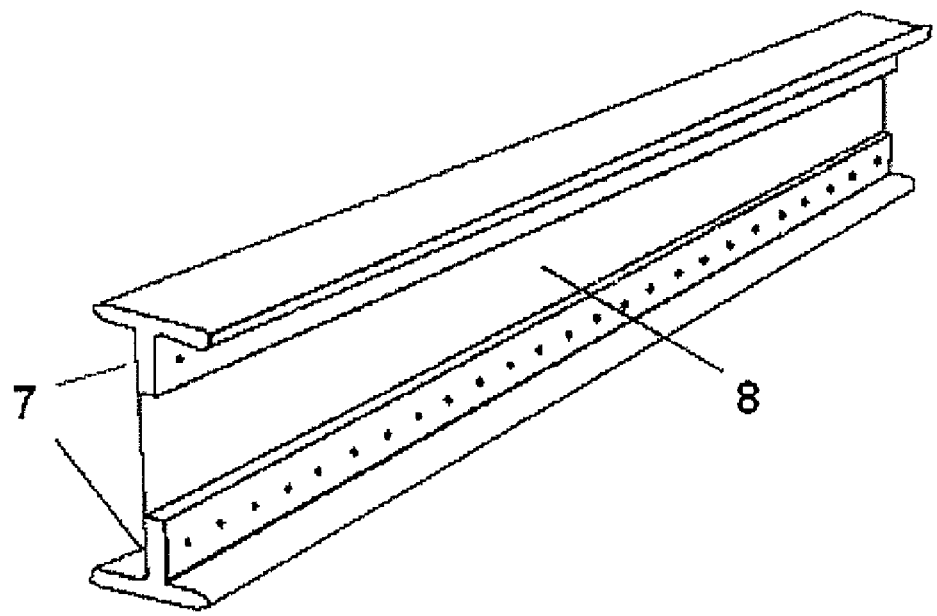
FIG. 2c shows a typical spar of a military airplane wing with a typical multispar structure.
Figure 3:
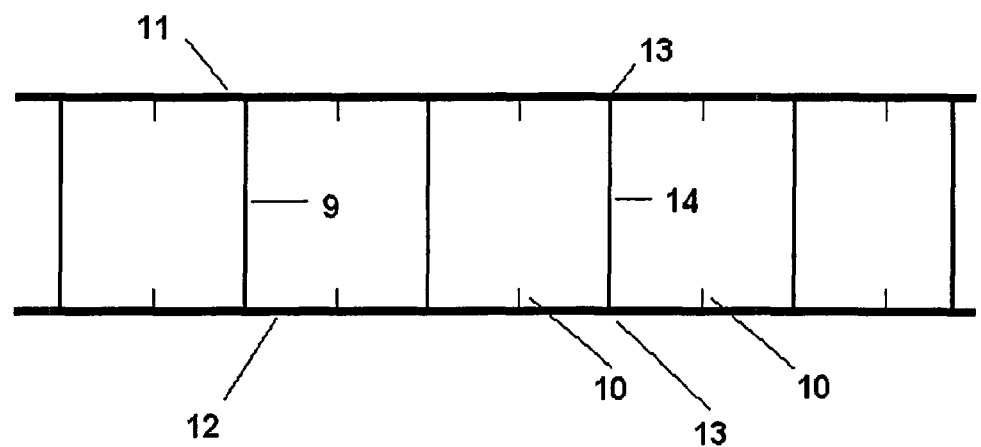
FIG. 3 schematically shows a cross-section of a multispar box with longitudinal stiffeners, object of the present invention.
Figure 4:
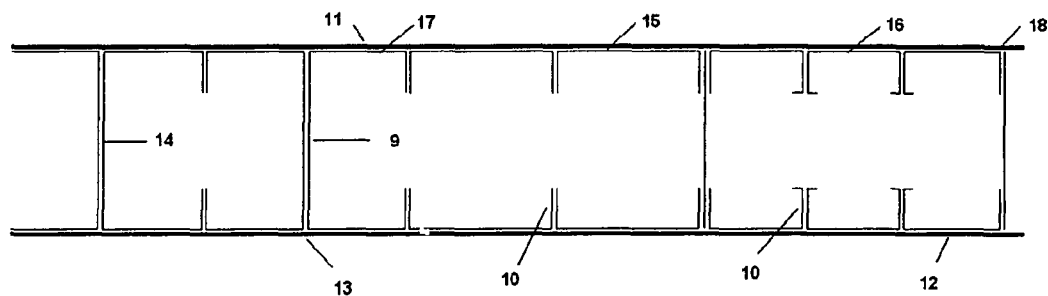
FIG. 4 schematically shows a cross-section of a multispar box with the structural elements forming it, object of the present invention.
Figure 5:
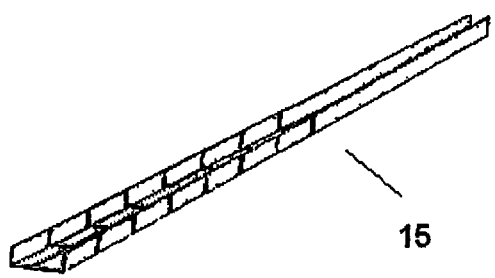
FIG. 5 schematically shows a U-shaped type 1 structural element forming a multispar box with longitudinal stiffeners, object of the present invention.
Figure 6:
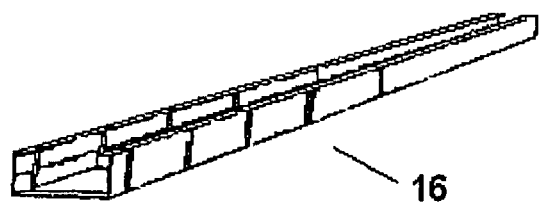
FIG. 6 schematically shows a U-shaped type 2 structural element with a flap forming a multispar box with longitudinal stiffeners, object of the present invention.
Figure 7:
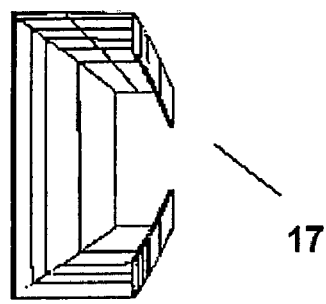
FIG. 7 schematically shows a C-shaped type 3 structural element with a flap forming a multispar box with longitudinal stiffeners, object of the present invention.

The invention relates to an integrated multispar torsion box structure of composite materials with longitudinal stiffeners with a T-shaped or I-shaped cross-section, all of this being co-cured. The composite material can be both carbon fiber and fiberglass with thermosetting or thermoplastic resin. The main field of application is aeronautical structures with supporting surfaces, although they can also be applied to other structures with similar features.

An integrated structure is one in which the different structural elements subjected to different stresses (shearing stress, normal stress etc.) are manufactured at one time or start from a single part. This is another advantage of the use of composite materials because, due to their conditions of independent layers which can be stacked in the desired manner, they offer the possibility of further integrating the structure, which further causes a cost saving since there are less individual parts to be assembled.

The main structure of supporting surfaces of airplanes is formed by a leading edge, a torsion box and a trailing edge. The torsion box is a typical structure formed by an upper panel and a lower panel with thin walls, and front 2 and rear 3 spars. Other structural elements such as ribs 4 and stringers 5 can be inside the torsion box, stiffening elements also being necessary in some of these components given their extreme thinness.

Depending both on the structural requirements and on the manufacturing, maintainability, certification requirements etc., all these elements may or may not be essential and may be more or less effective.

The currently most used structure for a torsion box internally comprises several transverse ribs 4 between the front 2 and rear 3 spars, the main functions of which ribs are to provide torsional rigidity, limit the skins and the stringers longitudinally so as to discretize the buckling loads and maintain the shape of the aerodynamic surface (see FIG. 1). This structure is further usually stiffened longitudinally by stingers 5.

Another structural concept of a torsion box is the multispar (see FIG. 2), where the ribs are dispensed with and multiple spars 6 are introduced, which spars comprise in turn a chord or leg 7 and a web 8.

The objective of this invention is the creation of a highly integrated torsion box structure, without ribs, with several I-shaped or T-shaped longitudinal stiffeners 10 (stringers) and spars 9, to achieve an effective structure as regards strength/rigidity and low weight. An integrated structure can thus mean a manufacturing cost saving and an improvement in quality.

The multispar box object of the present invention is formed by skins 11 and 12, which are the elements closing the box at the upper and lower part and are characterized by mainly supporting compression-traction and shear the loads in the plane. Stringers 10 have been introduced to achieve sufficient rigidity of these panels 11 and 12 and stabilize them against buckling, without increasing their thickness. The stringers also assume part of the longitudinal flows resulting from bending moments.

On the other hand, there are multiple spars 9 which, like skins 11 and 12, are typical thin-walled structures. They must mostly support bending and torsion loads. In a simplified manner, the resulting shear flows must be supported by the web of the spar 9, whereas the legs or chords of the spars 9 must support the traction and compression loads resulting from the bending.

Therefore, from the structural point of view, the box comprises the following elements:
Lower skin 12
Upper skin 11
Several spars 9, which are in turn formed by:
Chord 13
Web 14
Several stringers 10 in the upper skin 11
Several stringers 10 in the lower skin 12.

The process for producing a torsion box according to the present invention is carried out such that U-shaped elements 15 (type 1), U-shaped elements 16 with a flap (type 2) or C-shaped elements 17 with a flap (type 3) are individually formed when the fiber layers 20 are stacked. Each of these elements 15, 16, 17 assume several structural functions which when joined, give rise to the desired complete configuration. In a last step, the entire component is cured in a single cycle and a completely integrated multispar box structure including stringers 10 is achieved.

Figure 8:
FIG. 8 shows the planar stacking of a structural element forming a multispar box with longitudinal stiffeners, object of the present invention.

The detailed steps of the process for manufacturing a multispar torsion box of composite material will be described below, which process is divided into four steps:

In step 1, the carbon fiber or fiberglass layers 20 are separately stacked in a planar manner, which layers form each element 15, 16, 17. These stacks can perfectly well have stiffeners 19, undergo plane changes and have stacking changes according to whether it will later form part of a panel 11, 12, spar 9 or stringer 10, as shown in FIG. 8.

Figure 9:
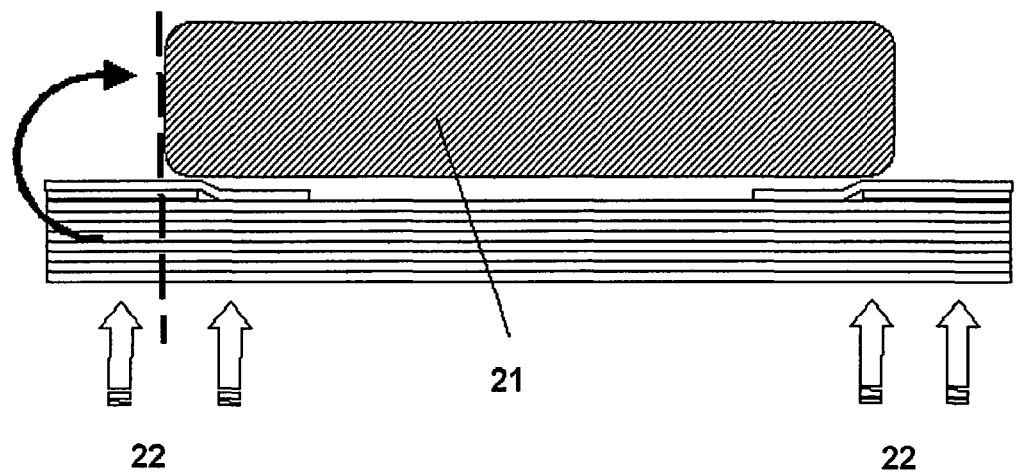
FIG. 9 schematically shows the bending of a structural element forming a multispar box with longitudinal stiffeners, object of the present invention.

In step 2, the stack is bent. This bending can be carried out in different ways, preferably by means of applying a vacuum and temperature cycle 22 molding the stack with the desired geometry by means of the suitable jig 21, which jig copies its inner geometry as shown in FIG. 9.

Figure 10:
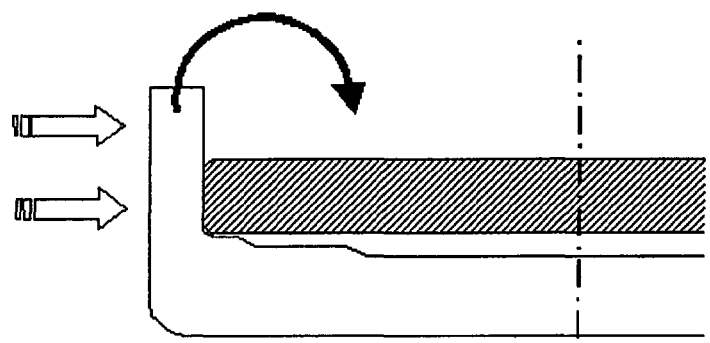
FIG. 10 show the result of a bending and of a possible second bending of a structural element forming a multispar box with longitudinal stiffeners, object of the present invention.

If an I-shaped stringer 10 is required, it might be necessary to bend a second time (FIG. 10) to achieve a type 2 element 16.

Figure 11:
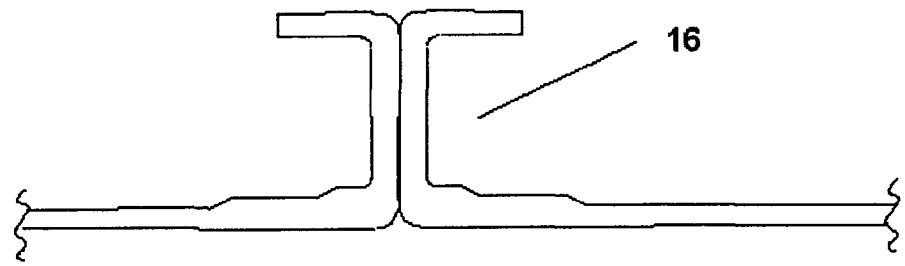
FIG. 11 shows the joining of two structural elements, forming I-shaped stringers and panel, forming a multispar box with longitudinal stiffeners, object of the present invention.
Figure 12:
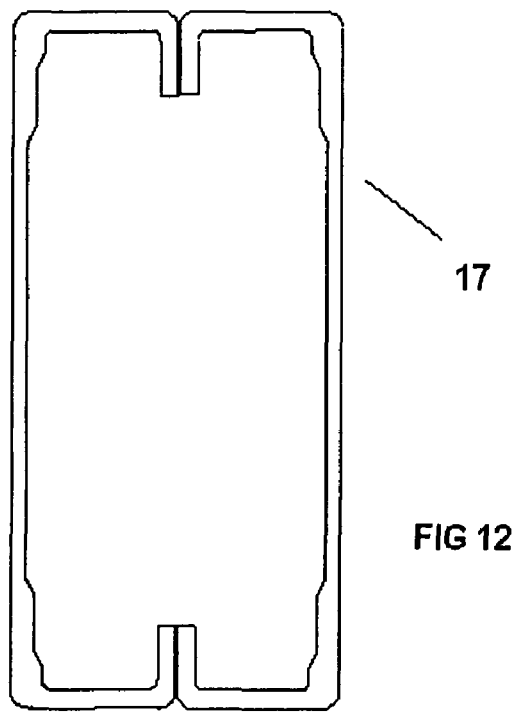
FIG. 12 shows the joining of two structural elements, forming T-shaped stringers and spars and panel, forming a multispar box with longitudinal stiffeners, object of the present invention.
Figure 13:
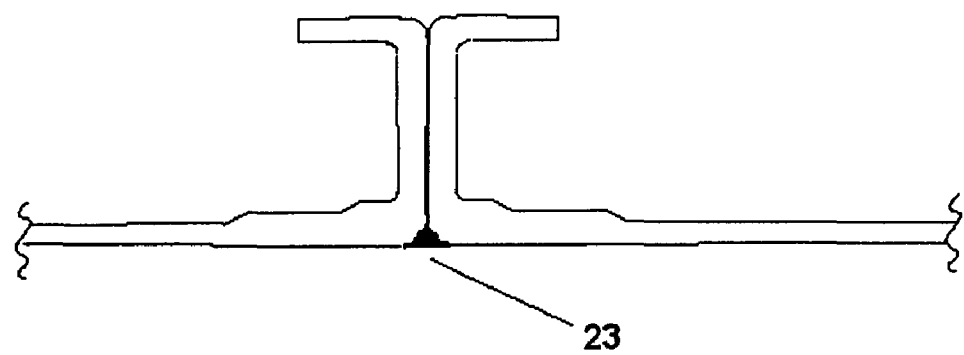
FIG. 13 shows the position of the rovings joining two structural elements forming a multispar box with longitudinal stiffeners, object of the present invention.

In step 3, the different elements are joined to form the integrated structure, according to FIGS. 11 and 12. It may be necessary to introduce rovings (unidirectional fiber strips which must be of the same material as that used in the stacks or a compatible material) in this phase to prevent gaps and thus ensure an optical co-curing (FIG. 13). It is also possible that continuous stacks are required outside the box, which would correspond to pure skins, type 4 elements 18.

In step 4, the complete structure is cured by means of applying a pressure and temperature cycle, with the aid of the suitable jig system, which allows the suitable compaction of all the areas of the structure.

The modifications comprised within the scope defined by the following claims can be introduced in the embodiment which has just been described.

The invention claimed is:

1. An integrated multispar torsion box structure of composite material for use in an aircraft, comprising a lower skin (12), an upper skin (11), a plurality of spars (9) each having a chord (13) and a web (14), a plurality of stringers (10) extending longitudinally from the lower skin (12) and the upper skin (11) having a T-shaped or I-shaped cross-section, wherein the integrated torsion box structure is achieved by means of joining unitary U-shaped structural elements (15), unitary U-shaped structural elements (16) having at least one flap and unitary C-shaped structural elements (17) having at least one flap.

2. An integrated multispar torsion box structure of composite material for aircraft according to claim 1, characterized in that the composite material is carbon fiber.

3. An integrated multispar torsion box structure of composite material for aircraft according to claim 1, characterized in that the composite material is fiberglass with thermosetting resin.

4. An integrated multispar torsion box structure of composite material for aircraft according to claim 1, characterized in that the composite material is fiberglass with thermoplastic resin.

* * * * *